United States Patent Office 3,492,831
Patented Feb. 3, 1970

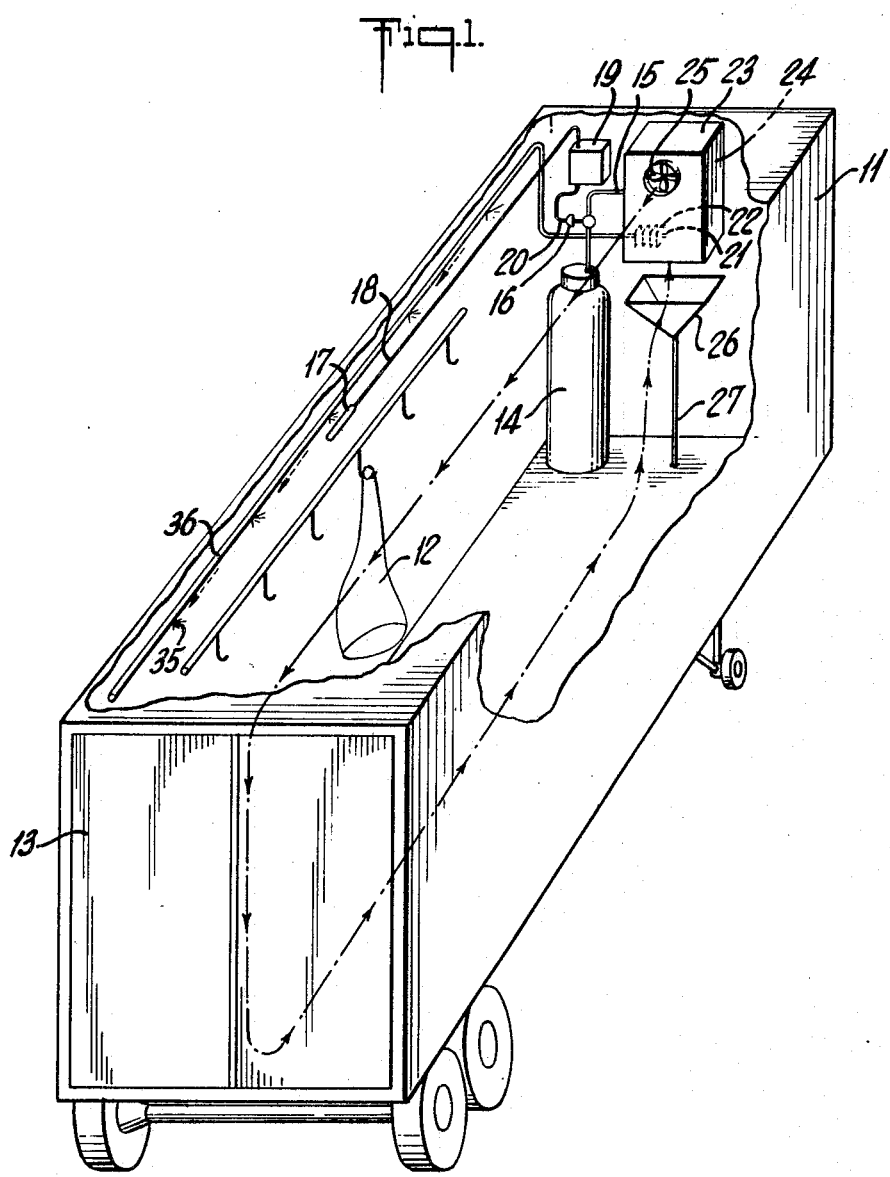

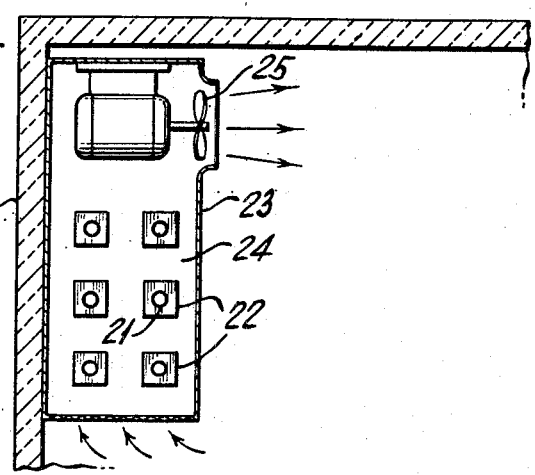
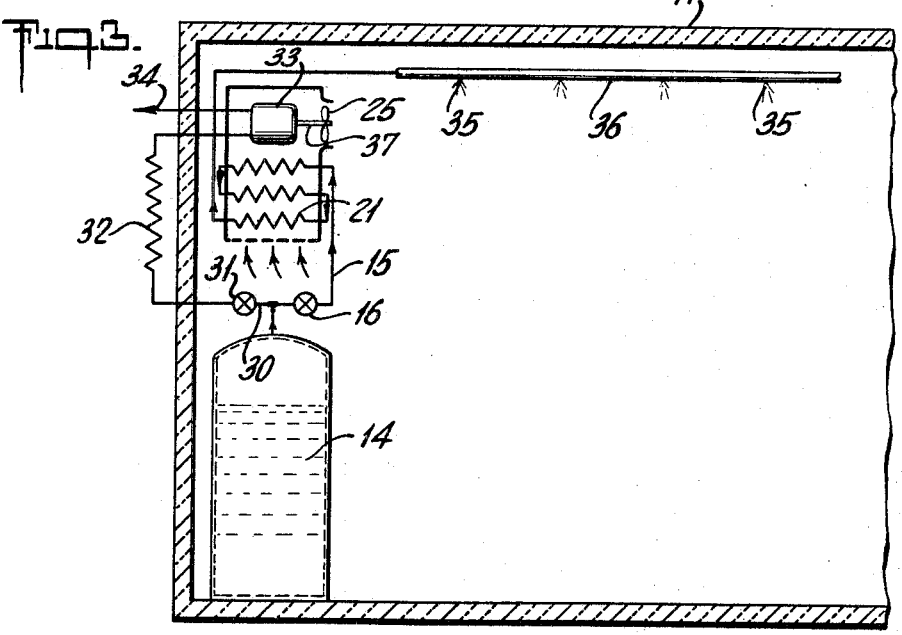
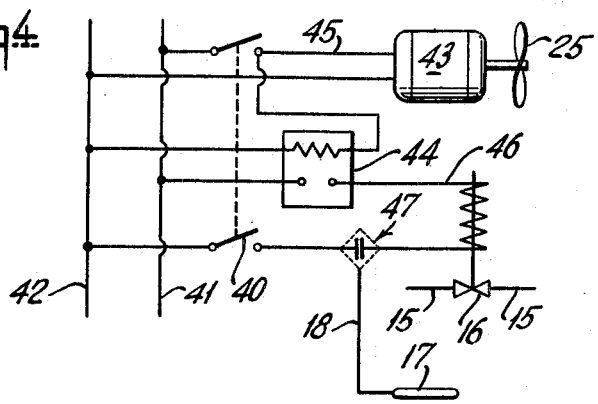

3,492,831
MEAT REFRIGERATION AND DEHUMIDIFICATION SYSTEM
David P. Maurer, Williamsville, and Donald M. Spencer, Tonawanda, N.Y., assignors to Union Carbide Corporation, a corporation of New York
Filed July 1, 1968, Ser. No. 741,389
Int. Cl. F25d 25/00, 17/06; A23b 1/04
U.S. Cl. 62—62
12 Claims

ABSTRACT OF THE DISCLOSURE

A system for moisture removal from meat refrigerated by cold vapor spray from liquefied gases is provided by circulating gas in contact with the meat for evaporative transfer of moisture thereto and cooling of the meat, cooling of the moisture-added gas by the liquefied gas for water condensation, and draining the water from the meat storage chamber.

BACKGROUND OF THE INVENTION

This invention relates to a method of and apparatus for simultaneous intransit refrigeration of meat from a low-boiling liquefied gas and moisture removal from such meat.

The intransit refrigeration of perishables by spraying cold fluid from a liquefied gas storage body into the perishable product storage chamber is well-known, as exemplified by the system described in Kane et al. U.S. Patent No. 3,287,925. Special problems are encountered when the perishable product is meat which is to be shipped in the refrigerated but unfrozen state. For example, it is often desirable to ship freshly slaughtered sides of beef from the slaughter house to a meat distributor or retailer. The aforementioned liquefied gas spray system is quite effective insofar as the refrigeration function is conerned, but does not provide for moisture removal.

Surface moisture has long been recognized as a problem in refrigerative shipment of fresh meat. The latter is not only difficult to handle when wet but also may develop a slimy appearance which is unappealing. The surface moisture problem is particularly acute when the meat is transported in a chamber which is frequently opened to the warmer atmosphere. Under these circumstances moisture from the warmer air is repeatedly deposited on the colder outer surface of the meat inside the chamber.

It is an object of this invention to provide an improved method of and apparatus for meat refrigeration in which surface moisture is removed.

Another object is to provide such method and apparatus in which cold vapor spray from a body of stored low-boiling liquefied gas is used to refrigerate but not freeze meat, and in which moisture accumulating on the meat outer surface is continuously removed.

Other objects and advantages of this invention will be apparent from the ensuing disclosure and appended claims.

SUMMARY

In the method aspect of the invention, pressurized low boiling gas having a boiling point at atmospheric pressure below about −20° F., e.g. liquid nitrogen, is provided in a thermally insulated storage container. The latter is associated with a storage chamber closed from the atmosphere and holding the meat which is partially surrounded by a gas space.

The gas temperature within the storage chamber is monitored, as for example by a temperature sensing bulb or thermocouple, and cold liquid is dispensed from the storage container in response to the monitored gas temperature. This cold liquid is heat exchanged with circulating warmer environment gas in the storage chamber so as to vaporize the liquid, partially warm the resulting vapor and condense moisture from the gas. This condensed moisture is collected and discharged from the storage chamber. The still cold vapor is sprayed as a multiplicity of discrete streams into the storage chamber so as to maintain the monitored gas temperature in a selected temperature range of 35° to 50° F.

The moisture-depleted cooled environment gas is circulated in contact with the meat for evaporative moisture transfer to the gas and refrigeration of the meat. The resulting moisture-added warmed gas is recirculated to the aforementioned heat-exchanging step as the circulating warmer gas.

In the apparatus of this invention, the spray conduit means are positioned within the upper portion of the storage chamber and extending substantially the entire length thereof with openings spaced along the length for discharging a multiplicity of discrete cold vapor streams into the storage chamber for cooling same. Liquid discharge conduit means are joined at one end to the liquid container and at the other end to the inlet of first heat exchange passageway means. The latter are provided with downwardly oriented extended members on the passageway's outer surface.

Enclosure means are provided having walls partially surrounding and spaced from the first heat exchange passageway means. This space forms second heat exchange passageway means in thermal association with the first passageway. Vapor discharge conduit means are provided with an inlet end joined to the discharge end of the first heat exchange passageway means, and an outlet end joined to the previously mentioned spray conduit means for transporting the cold vapor into refrigerative contact with the meat.

Fan means are positioned adjacent to and in flow communication with the enclosure means for circulating environment gas therethrough and thereafter from end-to-end of the storage chamber. A water collector is positioned within the storage chamber beneath the downwardly oriented extended members of the first heat exchange passageway means. Water drain means join this water collector and extend outside the storage chamber.

This invention provides for continuous removal of moisture from the meat by evaporation into circulating environment gas and removing the moisture as condensation by refrigerative transfer from the low-boiling liquefied gas before the latter is sprayed as cold vapor into the meat storage chamber. At the same time the meat is kept at the desired refrigeration temperature which is slightly above the water freezing point and the moisture is removed without ice formation on the apparatus, even though the liquid refrigerant is stored and supplied at temperature far below the water freezing point, e.g. −320° F. for liquid nitrogen at atmospheric pressure. Other advantages of the invention will be apparent from the ensuing disclosure and appended claims.

BRIEF DESCRIPTION OF THE DRAWINGS

FIG. 1 is an isometric schematic view of a truck semi-trailer incorporating one embodiment of the invention.

FIG. 2 is a schematic view taken in cross-sectional elevation of the FIG. 1 heat exchanger-fan assembly on an enlarged scale.

FIG. 3 is a schematic view taken in cross-sectional elevation of an alternate heat exchanger-fan assembly in which the fan is driven by vapor from the low-boiling refrigerant.

FIG. 4 is a simplified electrical diagram for circuitry required to operate the fan for a predetermined period to remove frost accumulation before refrigerant flow is restarted.

DESCRIPTION OF PREFERRED EMBODIMENTS

Referring now to the drawings, FIGS. 1 and 2 illustrate an embodiment in which a mobile thermally insulated storage chamber 11 is provided for fresh meat 12 often in the form of hanging carcasses. This chamber 11 may be of standard construction for typical mobile refrigerated chambers, e.g. reinforced aluminum siding outer walls, plywood panelled inner walls and asbestos or plastic foam insulating material between the two walls. The chamber is closed to the atmosphere but need not be air-tight, as access means such as rear doors 13 are needed for insertion and removal of the meat 12.

A double-walled mobile thermally insulated container 14 is associated with storage chamber 11 for storing pressurized low-boiling liquefied gas having a boiling point at atmospheric pressure below about $-20°$ F. The construction of such containers is well-known and is, for example, depicted in Loveday et al. U.S. Patent No. 2,951,348. Container 14 is depicted within storage chamber 11 but it also may be positioned outside this chamber. Container 14 includes an outer shell completely surrounding an inner storage vessel to form an evacuable insulation space therebetween. This space is preferably filled with an efficient solid thermal insulating material, as for example alternate layers of radiation-impervious barriers such as aluminum foil separated by low conductive fibrous sheeting, as for example glass fibers. This particular highly efficient insulation is described in U.S. Patent No. 3,007,596 to L. C. Matsch. Other suitable insulating materials include layers of aluminum-coated polyethylene terephthalate. Alternatively, powdered insulation material, as for example perlite or finely divided silica, may be employed.

To remove gases accumulating in the evacuated insulating space, an adsorbent material, as for example calcium zeolite A, or a gettering material, as for example powdered barium, may be provided therein to retain a high level of insulating quality.

Low-boiling liquefied gases which are suitable for use as refrigerants in the present invention are those which have a boiling point at atmospheric pressure below about $-20°$ F. Examples of such liquefied gases are liquid air, liquid argon, liquid carbon dioxide, liquid helium, and liquid nitrogen. Liquid nitrogen is particularly suitable because of its inertness and relative ease of separation from air. While the subsequent discussion refers specifically to nitrogen, it is to be understood that all of the aforementioned gasses are suitable along with mixtures thereof. Although the primary function of storage chamber 11 is to refrigerate the meat 12, the preferred liquefied gases such as nitrogen also control the atmosphere within the chamber and provide an inert blanket surrounding the meat.

The storage vessel within storage container 14 is filled with liquefied nitrogen by means well known to the prior art, such as for example connecting a source of liquefied nitrogen stored at above atmospheric pressure to the container. If the liquid nitrogen is stored at a pressure below the operating pressure of container 14, a suitable pump would be employed and usually additional heat would be added to the pressurized liquid before transferring it into container 14. The liquid nitrogen is preferably charged into container 14 and stored therein at saturated conditions and at temperatures corresponding to a vapor pressure above 10 p.s.i.g. with the entire liquid and vapor substantially in equilibrium. If one of the aforementioned highly efficient insulations are used, there is no appreciable amount of heat inleak to the inner storage vessel of container 14 and the stored liquid nitrogen is dispensed only by this as-charged vapor pressure. Alternatively the liquid nitrogen may be charged to container 14 under non-saturated conditions and even in the subcooled state. Under these circumstances it would probably be necessary to provide means for building sufficient internal pressure on demand to discharge the liquid. Those skilled in the art will appreciate that this heat may be introduced externally, using the well-known pressure building coil. The latter includes a liquid discharge conduit, an atmospheric heat vaporizer and a return conduit for the resulting vapor to the container gas space (not illustrated).

As still another variation known to the art, a less efficient heat insulating material may be used so that sufficient atmospheric heat inleak is available to vaporize sufficient stored liquid refrigerant to form gas pressure to insure liquid discharge on demand.

It is preferred to store the liquid refrigerant at pressure below about 100 p.s.i.g., because at higher pressures the inherent lag characteristics of presently known temperature sensing elements will not permit adequate control of the liquid refrigerant withdrawal. The storage pressure is preferably above about 10 p.s.i.g. to provide sufficient driving force for substantially uniform distribution of cold gas through the spray orifices.

Liquid discharge conduit 15 is joined at one end to storage container 14 and has control valve 16 therein as part of a liquefied gas flow control system. The latter includes temperature sensing element 17, as for example a bulb positioned within the storage chamber 11 gas space. This bulb is connected by signal transmitting means 18 to temperature controller 19, and signal transmitting means 20 provides communication betwen the controller and control valve 16 in liquid discharge conduit 15. The flow control means may be electrically or pneumatically operated.

First heat exchange passageway means 21 having downwardly oriented extended member 22 on the outer surface thereof are joined at an inlet end to the liquid discharge conduit 15. The vaporized refrigerant is discharged from passageway 21 through an overhead spray conduit into the meat chamber 11 (discussed hereinafter in detail). Passageways 21 are partially surrounded by enclosure 23 having walls spaced therefrom to form second heat exchange passageway 24 in thermal association with the first passageway means 21. As depicted in FIGS. 1 and 2, first passageway 21 comprises three overlying layers of tubing with the inlet at the top and the outlet at the bottom. More or fewer layers of tubing might be used depending on the heat transfer requirements, and such tubing may be coiled instead of the straight run type. The extended members 22 are in the form of longitudinally spaced fins. Alternatively the extended members could be oriented parallel to the tube axis at spaced intervals around the outer surface thereof, but with this construction the tubes should be inclined for effective drainage of condensed moisture. The function of extended surfaces 22 is to provide a large surface area for moisture condensation from the environment gas circulating around the surfaces. Accordingly they need not be entirely or even partially constructed of heat conductive metal but such metal may be coated with a poor conductor such as polytetrafluoroethylene plastic, so as to minimize frosting from the cold refrigerant in passageways 21. It will be appreciated, however, that a substantial temperature gradient exists between the relatively warm outer tip of the extended surfaces and the colder section joined to passageways 21.

Fan 25 is positioned adjacent to and in flow communication with enclosure 23 for circulating environment gas therethrough and thereafter from end-to-end of storage chamber 11. In the FIGS. 1 and 2 embodiment, enclosure 23 has vertical walls and is open at the bottom and top ends. Fan 25 is positioned adjacent to the upper open end with its blades in flow communication with the chamber upper portion so that moisture-added warmed gas (having previously contacted the meat) is drawn into the enclosure's open lower end. This gas is drawn upwardly by fan 25 in heat exchange relation with the nitrogen refrigerant in first passageway 21 and is cooled thereby to at least the dew point and normally above 32° F. The moisture condensate either falls freely through the open lower end of enclosure 23 or collects on downwardly oriented extended surfaces 22 and drains therefrom. The cooled moisture-depleted environment gas discharged from second heat exchange passageway 24 is circulated in heat exchange relation with meat 12 having a warmer surface layer of moisture. The latter is evaporated into the circulating environment gas which in turn is warmed and returned to the inlet end of second passageway 24 for recycling through the heat exchanger. A preferred environment gas flow pattern is indicated by arrows in FIG. 1, although part of this gas may not reach the chamber end remote from the fan. Whereas the environment gas comprises atmospheric air immediately after closing of doors 13, its composition approaches that of the refrigerant during operation of the system and before the doors are reopened. That is, the refrigerant vapor becomes a progressively larger part of the environment gas. The composition changes because in practice chamber 11 is not gas-tight and leakage occurs to the atmosphere.

The water is collected in funnel-shaped member 26 positioned beneath extended surfaces 22 and drained outside storage chamber 11 through conduit 27. A drain valve may be provided in conduit 27 if desired.

It will be appreciated by those skilled in the art that the aforedescribed heat exchanger-fan-condensate collector assembly may be positioned in special relationships other than the FIGS. 1–2 embodiment. For example, the fan may be located at an open side instead of the end of first passageways 21 so that the chamber environment gas flows generally horizontally across the passageways instead of end-to-end (as shown).

Fan 25 may be any rotating device capable of circulating the environment gas around extended surfaces 22 and through chamber 11. The axial flow or propeller type fan is preferred because of its relatively low power consumption, but the centrifugal-type fan consisting of a circular cage and rotating vanes may be used instead. Although only one fan 25 is illustrated in the figures, it should be recognized that multiple fans may be used to achieve flow variation. As still another modification, fan 25 may be positioned to blow the environment gas past the extended surfaces 22 instead of to draw such gas across the surfaces as illustrated in FIGS. 1 and 2. The latter arrangement is preferred from the standpoints of heat transfer and moisture removal efficiency.

In the preferred FIGS. 1–2 embodiment wherein the environment gas is drawn upwardly around the first heat exchange passageways 21, the gas velocity is preferably less than 750 feet per minute to prevent entrainment of water in the moisture-depleted cooled gas discharged from the heat exchanger for circulation in contact with the meat. It should be recognized that the maximum permissible gas velocity (without appreciable entrainment) depends to a considerable extent on the specific heat exchange configuration, i.e. the spacial relationship between first passageways 21, extended surfaces 22 and enclosure 23. For example, entrainment of moisture collected on the extended surfaces is less likely than if the moisture is present as freely falling droplets. Accordingly, the heat exchanger should be designed for quick run-off of moisture downwardly from the extended surfaces to the collector 26.

Fan 25 may be electrically powered from a battery and generator if sufficient power is available on-board the means for pulling the meat storage chamber 11, e.g. a tractor battery. Alternatively, the fan 21 may be powered by expansion of warmed pressurized refrigerant vapor from liquid container 14, as for example illustrated in the FIG. 3 embodiment.

In FIG. 3, a pressurized liquid refrigerant stream is withdrawn from container 14 through conduit 30 having control valve 31 therein, vaporized and superheated by the atmosphere in passageway 32 located outside meat storage chamber 11. The resulting warm vapor is directed to gas expander 33, which for example may be a commercially available sliding vane-type air motor with an inlet pressure of about 10–25 p.s.i.g. operating at 200–1500 r.p.m. or greater. Alternatively expander 33 may be the turbine-type. The exhausted refrigerant vapor is discharged from expander 33 through conduit 34 preferably communicating with the atmosphere. Expander 33 is joined by shaft coupling 35 to fan 25. If the desired operating speed of fan 25 is not suitable for driving expander 33, speed change by belt drive or gears may be used.

It will be apparent from the aforedescribed embodiment that the refrigerant liquid discharged from storage container 14 initially receives heat from the environment gas at the upper end of the heat exchanger. The environment gas at this upper end has already flowed through the lower section of the heat exchanger in countercurrent flow relation with the refrigerant fluid. This countercurrent flow relation is preferred so that the incoming moisture-containing environment gas initially contacts the warm end of first passageway 21, thus permitting moisture condensation on the warmer extended surfaces 22 before reaching the colder surfaces 22. In such manner, frost accumulation is completely avoided or at least greatly minimized.

During operation of this system, fan 25 is continuously run to circulate the environment gas, but refrigerant flow is only periodic. That is, liquid discharges through valve 16 as long as element 17 senses a chamber gas temperature above the element's set point and doors 13 are closed. When the chamber gas temperature drops below the element 17 set point, refrigerant flow stops automatically. Refrigerant flow is also terminated, either manually or automatically, when doors 13 are opened.

It should be recognized that temperatures in the heat exchanger do not remain constant during the refrigeration period. For example, when the refrigerant flow to the heat exchanger is started, the vapor emerges from first passageway 21 at a relatively warm level and relatively little refrigeration is introduced into meat chamber 11 through spaced openings 35 in the overhead conduit 36 extending substantially the end-to-end length of meat chamber 11. During this period there is of course no danger of frost formation on the extended surfaces 22. However, as refrigerant flow continues and the environment gas is circulated, the refrigerant vapor is discharged from the heat exchanger at progressively lower temperatures. If the refrigeration flow is uninterrupted for a sufficiently long period, i.e. refrigerant control valve 16 is not closed responsive to temperature sensing element 17 or the doors 13 to meat chamber 11 are not opened and warm moist air introduced, the refrigerant vapor discharge temperature will approach 32° F. and frost may begin to form on the extended surfaces at the heat exchanger cold end where the environment gas emerges. Accordingly, it is contemplated in the practice of this invention that there may be short periods in which some frosting occurs at the heat exchanger cold end. However, even under these circumstances moisture is being condensed on the extended surfaces of most of the heat exchanger length, drained from these downwardly oriented surfaces, collected and discharged from the storage chamber.

In a preferred embodiment, the environment gas is circulated for a predetermined period before cold liquid is dispensed from liquid refrigerant storage container 14 to first heat exchange passageways 21. This is to insure that any frost formed on the extended surfaces 22 during the previous "on" cycle is melted off for removal through collector 26. Otherwise there is a tendency for additional frost accumulation at the cold end during subsequent "on" cycles, with correspondingly reduced efficiency in moisture removal as the frost spreads to the remaining length of the heat exchanger.

FIG. 4 illustrates an electrical circuit which provides the aforementioned time delay between environment gas circulation and refrigerant flow. After the doors 13 have been closed, switch 40 is turned on (either manually, or automatically by an electrical circuit not illustrated). Power is transmitted through supply wires 41 and 42 to operate electric motor 43 and in turn fan 25. Liquid refrigerant control valve 16 in discharge conduit 15 is operated by the same electrical circuit and may be the solenoid type. However, opening of same is delayed by time delay relay 44 electrically joined to motor 43 by wire 45. Relay 44 may for example comprise a bi-metallic element which is heated electrically so that electricity flows through connecting wire 46 to solenoid-type control valve 16 after a selected time delay, e.g. two minutes. Thermal switch 47, provided in wire 48 joining solenoid valve 16 and power wire 42, is operated by temperature sensing element 17 through signal transmitting means 18, either pneumatic or electrical. In operation, unless time delay relay 44 is closed, control valve 16 does not immediately open when the meat storage chamber temperature rises above the set point of temperature sensing element 17 and switch 47 closes. Accordingly the time delay control means are superimposed on the liquefied gas flow control means.

The advantages of this invention were qualitatively illustrated by a series of field tests wherein liquid nitrogen refrigeration systems were used for local delivery of 5,000–12,500 pounds beef loads in Texas for a total of five days with ambient temperatures of 71–95° F. The refrigeration periods were 5–11 hours and the set point for the temperature sensing element was normally 45° F. The meat storage chamber was an insulated truck provided with an overhead refrigerant spray conduit 114 inches long and containing nine spaced openings of 1/16-inch diameter.

The heat exchanger included 7/8-inch O.D. copper tubing with 5 external fins per inch length of tubing, the fins being 2 inch x 2.7 inch rectangles of 0.012 inch thick aluminum. The externally finned tubing was shaped as nine straight passes arranged in rows of three, both horizontally and vertically, having a total length of about 9 feet. The total extended surface area of fins was about 43 sq. ft. and the assembly was positioned within an enclosure 22 inches long x 12 inches wide x 6 inches deep with open ends.

A 1/35 H.P. electric motor was coupled to an 8-inch blade axial flow type fan, and the motor-fan assembly was positioned above the aforedescribed externally finned tubes in the upper end of the enclosure at one end of the meat chamber with the fan blades facing the overhead refrigerant spray conduit and the rear end of the chamber. The motor-fan assembly was capable of drawing about 336 c.f.m. environment gas through the heat exchanger at 0.15 inch water pressure drop.

During operation, the system removed an average of about 5 lbs. water per day from the beef (both unwrapped swinging and wrapped stacked quarters). On one particular delivery of 11 hours duration, the system removed 8 lbs. water from the beef. The delivered meat was cold, firm, easy to handle and reasonably dry, and the customer reaction was highly favorable. The same customers had previously been receiving beef refrigerated by identical liquid nitrogen spray systems but lacking the dehumidification system, and on occasion had complained that the delivered meat was wet, visually unpleasing and difficult to handle.

Although preferred embodiments of the invention have been described in detail, it is contemplated that modifications of the method and apparatus may be made and that some features may be employed without others, all within the spirit and scope of the invention.

What is claimed is:

1. A method for meat refrigeration comprising the steps of:
   (a) providing pressurized low boiling liquefied gas having a boiling point at atmospheric pressure below about −20° F. in a thermally insulated storage container associated with a storage chamber closed from the atmosphere and holding meat at least partially surrounded by a gas space;
   (b) monitoring the gas temperature within said storage chamber;
   (c) dispensing cold liquid from said storage container in response to the monitored gas temperature; heat exchanging the dispensed cold liquid with circulating warmer gas in said storage chamber to simultaneously vaporize said liquid and partially warm the resulting vapor, and condense moisture from said gas while cooling same to temperature above 32° F.; and spraying said vapor as a multiplicity of discrete streams into said storage chamber so as to maintain said monitored gas temperature in a selected temperature range of 35° F. to 50° F.;
   (d) collecting and discharging the condensed moisture from said storage chamber;
   (e) circulating the moisture-depleted cooled gas in contact with said meat for evaporative moisture transfer to the gas and refrigeration of the meat; and
   (f) recirculating the moisture-added warmed gas to the heat exchanging step as said warmer gas.

2. A method according to claim 1 in which said warmer gas flows upwardly at velocity of less than 750 feet per minute in heat exchange with said dispensed cold liquid.

3. A method according to claim 1 in which said condensed moisture is collected by gravity draining.

4. A method according to claim 1 in which the dispensed cold liquid flows downwardly in countercurrent heat exchange with upwardly flowing warmer gas.

5. A method according to claim 1 in which nitrogen comprises said low boiling liquefied gas.

6. A method according to claim 1 in which the warmed sprayed vapor is circulated along with said moisture-added warmed gas to the heat exchanging step as said warmer gas.

7. A method according to claim 1 in which said gas is continuously circulated in said storage chamber and said cold liquid is periodically dispensed from said container to maintain the chamber temperature below a predetermined level.

8. A method according to claim 1 in which the cold liquid dispensing is continued for sufficient duration to cool the circulating gas below 32° F. with freezing of condensed moisture, said cold liquid dispensing is terminated, said storage chamber is thereafter exposed to the atmosphere and subsequently reclosed, and the gas is again circulated within said storage chamber for a predetermined period before said dispensing of cold liquid for said heat exchanging with said gas.

9. In a system for the intransit refrigeration of meat, an apparatus comprising in combination:
   (a) a storage chamber for said meat;
   (b) a thermally insulated container associated with the storage chamber for storing pressurized low-boiling liquefied gas having a boiling point at atmospheric pressure below about −20° F.;
   (c) spray conduit means positioned within the upper portion of said storage chamber and extending substantially the entire length thereof with openings spaced along the length for discharging a multiplicity of discrete cold vapor streams into the storage chamber for refrigerating meat therein;
   (d) liquid discharge conduit means joined at one end to said container;
   (e) first heat exchange passageway means having downwardly oriented extended members on the outer surface thereof, and joined at an inlet end to the other end of said liquid discharge conduit means;
   (f) enclosure means having walls partially surrounding and spaced from said first heat exchange passageway means to form second heat exchange passageway means in thermal association with said first heat exchange passageway means;
   (g) liquefied gas flow control means comprising a temperature sensing element positioned within said storage chamber, a control valve operably interposed in said liquid discharge conduit being connected to said temperature sensing element to be responsive to the storage chamber temperature as sensed by such element;

(h) vapor discharge conduit means having an inlet end joined to the discharge end of said first heat exchange passageway means and having an outlet end joined to said spray conduit means;

(i) fan means positioned adjacent to and in flow communication with said enclosure means for circulating gas therethrough and thereafter from end-to-end of said storage chamber;

(j) a water collector positioned within said storage chamber beneath the downwardly oriented extended members of said first heat exchange passageway means; and (k) water drain means joined to said water collector and extending outside said storage chamber.

10. Apparatus according to claim 9 in which said fan is positioned at the upper end of said enclosure means and aligned to circulate gas in longitudinal end-to-end flow communication with the upper portion of said storage chamber.

11. Apparatus according to claim 9 with time delay control means superimposed on said liquefied gas flow control means to operate said fan for a predetermined period before said liquefied gas flow control means opens said control valve responsive to said temperature sensing element.

12. Apparatus according to claim 11 in which said time delay control means comprises a bi-metallic element means to electrically heat said element, and electric wire means joining said element and said control valve for opening said valve on heating of said element.

References Cited

UNITED STATES PATENTS 3,315,480   4/1967   Rich _____ 62—380 X
3,447,336   6/1969   Gramse _____ 62—239

WILLIAM E. WAYNER, Primary Examiner

U.S. Cl. X.R.

62—93; 99—194